United States Patent
Paramasivam et al.

(10) Patent No.: US 11,724,604 B2
(45) Date of Patent: Aug. 15, 2023

(54) SPLIT PANEL ARRAY PLATE ASSEMBLIES FOR ELECTRIFIED VEHICLE BATTERY PACKS

(71) Applicant: FORD GLOBAL TECHNOLOGIES, LLC, Dearborn, MI (US)

(72) Inventors: Saravanan Paramasivam, South Lyon, MI (US); Rajaram Subramanian, Ann Arbor, MI (US); Mallikarjun Veeramurthy, Farmington Hills, MI (US); Bhaskara Boddakayala, Troy, MI (US); David J. Pfeiffer, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1083 days.

(21) Appl. No.: 16/016,729

(22) Filed: Jun. 25, 2018

(65) Prior Publication Data
US 2019/0393457 A1    Dec. 26, 2019

(51) Int. Cl.
*B60L 50/64* (2019.01)
*H01M 50/209* (2021.01)

(52) U.S. Cl.
CPC ........... *B60L 50/64* (2019.02); *H01M 50/209* (2021.01); *H01M 2220/20* (2013.01)

(58) Field of Classification Search
CPC ........... H01M 2/1077; H01M 2220/20; H01M 2/1083; H01M 10/613; H01M 10/625; H01M 10/647; H01M 10/6555; H01M 2/1072; H01M 2/1016; H01M 2/10–1088; H01M 50/209; B60L 50/64; Y02E 60/10; Y02T 10/70
See application file for complete search history.

(56) References Cited

U.S. PATENT DOCUMENTS

| | | | |
|---|---|---|---|
| 9,660,230 B2 | 5/2017 | Noh | |
| 2006/0115719 A1 | 6/2006 | Jeon et al. | |
| 2012/0141855 A1* | 6/2012 | Okada | H01M 2/1077 429/99 |
| 2013/0183571 A1* | 7/2013 | Miyazaki | H01M 2/20 429/156 |
| 2015/0004469 A1* | 1/2015 | Park | H01M 50/20 429/151 |

(Continued)

FOREIGN PATENT DOCUMENTS

| | | | |
|---|---|---|---|
| EP | 3026730 A1 | 6/2016 | |
| JP | 2017220357 A | 12/2017 | |
| WO | WO2016/084272 | * 6/2016 | .............. H01M 2/10 |

*Primary Examiner* — Kiran Quraishi Akhtar
(74) *Attorney, Agent, or Firm* — David B. Kelley; Carlson, Gaskey & Olds, P.C.

(57) ABSTRACT

This disclosure details battery assemblies for use within electrified vehicle battery packs. An exemplary battery assembly includes a grouping of battery cells and an array plate assembly contacting a portion of the battery assembly. The array plate assembly may embody a split panel design that includes an outer panel and an inner panel that are arranged to nest together. One or both of the outer panel and the inner panel may include an embossing pattern. Among various other advantages, the split panel design increases the stiffness of the array plate assembly without significantly increasing the overall package depth of the array plate assembly or the battery assembly.

19 Claims, 7 Drawing Sheets

(56) References Cited

U.S. PATENT DOCUMENTS

| | | | |
|---|---|---|---|
| 2015/0140406 A1* | 5/2015 | Kim | H01M 2/1077 |
| | | | 429/156 |
| 2015/0140408 A1* | 5/2015 | Hayashida | H01M 50/209 |
| | | | 429/159 |
| 2015/0270589 A1 | 9/2015 | Ejiri et al. | |
| 2016/0218332 A1* | 7/2016 | Baek | H01M 2/1077 |
| 2016/0315300 A1 | 10/2016 | Petersen et al. | |
| 2017/0054124 A1* | 2/2017 | Yoon | H01M 2/1077 |
| 2017/0110696 A1 | 4/2017 | Schoenherr | |
| 2017/0309877 A1 | 10/2017 | Wu et al. | |
| 2017/0352850 A1* | 12/2017 | Nagane | H01M 50/20 |
| 2018/0034024 A1* | 2/2018 | Chen | H01M 6/5038 |

* cited by examiner

SPLIT PANEL ARRAY PLATE ASSEMBLIES FOR ELECTRIFIED VEHICLE BATTERY PACKS

TECHNICAL FIELD

This disclosure relates to battery assemblies for electrified vehicle battery packs. An exemplary battery assembly may include a split panel array plate assembly for packaging a grouping of battery cells.

BACKGROUND

The desire to reduce automotive fuel consumption and emissions is well documented. Therefore, electrified vehicles are being developed that reduce or completely eliminate reliance on internal combustion engines. In general, electrified vehicles differ from conventional motor vehicles because they are selectively driven by one or more battery powered electric machines. Conventional motor vehicles, by contrast, rely exclusively on the internal combustion engine to propel the vehicle.

A high voltage battery pack typically powers the electric machines and other electrical loads of the electrified vehicle. The battery pack includes a plurality of battery cells that store energy for powering these electrical loads. The battery cells generate heat during charging and discharging operations. The external profile of the battery cells may bulge or swell during the charging and discharging operations. The bulging of the battery cells can cause deflection of surrounding array plates, thereby resulting in inconsistent array dimensions and packaging challenges.

SUMMARY

A battery assembly, according to an exemplary aspect of the present disclosure includes, among other things, a grouping of battery cells and an array plate assembly in contact with a portion of the grouping of battery cells. The array plate assembly includes an outer panel and an inner panel that nest together.

In a further non-limiting embodiment of the foregoing battery assembly, the grouping of battery cells includes a plurality of battery cells held within a plurality of array frames.

In a further non-limiting embodiment of either of the foregoing battery assemblies, the array plate assembly is received against at least one of the plurality of battery cells or at least one of the plurality of array frames.

In a further non-limiting embodiment of any of the foregoing battery assemblies, the array plate assembly is positioned at a longitudinal extent of the grouping of battery cells.

In a further non-limiting embodiment of any of the foregoing battery assemblies, the array plate assembly is positioned along a side of the grouping of battery cells.

In a further non-limiting embodiment of any of the foregoing battery assemblies, the inner panel is positioned between the grouping of battery cells and the outer panel.

In a further non-limiting embodiment of any of the foregoing battery assemblies, the outer panel or the inner panel includes an embossing pattern.

In a further non-limiting embodiment of any of the foregoing battery assemblies, each of the outer panel and the inner panel includes an embossing pattern, and a first plurality of ribbed sections of the embossing pattern of the inner panel nest within a first plurality of ribbed sections of the embossing pattern of the outer panel.

In a further non-limiting embodiment of any of the foregoing battery assemblies, a second plurality of ribbed sections of the embossing pattern of the outer panel nest within a second plurality of ribbed sections of the embossing pattern of the inner panel.

In a further non-limiting embodiment of any of the foregoing battery assemblies, the outer panel includes a first mounting leg, and the inner panel includes a second mounting leg that nests with the first mounting leg.

In a further non-limiting embodiment of any of the foregoing battery assemblies, the first mounting leg includes a first opening, and the second mounting leg includes a second opening that aligns with the first opening.

In a further non-limiting embodiment of any of the foregoing battery assemblies, a fastener extends through the first opening and the second opening.

In a further non-limiting embodiment of any of the foregoing battery assemblies, each of the outer panel and the inner panel includes a plurality of aligned mounting openings.

In a further non-limiting embodiment of any of the foregoing battery assemblies, the battery assembly is part of a battery pack.

In a further non-limiting embodiment of any of the foregoing battery assemblies, the battery pack is part of an electrified vehicle.

A method according to another exemplary aspect of the present disclosure includes, among other things, positioning an array plate assembly against a grouping of battery cells of a battery assembly. The array plate assembly includes a split panel design that includes an outer panel and an inner panel that are arranged to nest with one another.

In a further non-limiting embodiment of the foregoing method, positioning the array plate assembly includes positioning the array plate assembly at a longitudinal extent of the grouping of battery cells, positioning the array plate assembly along a side of the grouping of battery cells, or positioning the array plate assembly at the longitudinal extent and positioning a second array plate assembly along the side.

In a further non-limiting embodiment of either of the foregoing methods, the method includes inserting a fastener through the outer panel and the inner panel and into an array frame of the grouping of battery cells.

In a further non-limiting embodiment of any of the foregoing methods, the method includes inserting a fastener through nested mounting legs of the outer panel and the inner panel and then into a structure of an enclosure assembly that houses the battery assembly.

In a further non-limiting embodiment of any of the foregoing methods, the outer panel, the inner panel, or both include an embossing pattern that is configured to stiffen the array plate assembly without increasing an overall package depth of the battery assembly.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details battery assemblies for use within electrified vehicle battery packs. An exemplary battery assembly includes a grouping of battery cells and an array plate assembly contacting a portion of the grouping of battery cells. The array plate assembly may embody a split panel design that includes an outer panel and an inner panel that nest together. One or both of the outer panel and the inner panel may include an embossing pattern. Among various other advantages, the split panel designs described herein increase the stiffness of the array plate assembly without significantly increasing the overall package depth of the array plate assembly or the battery assembly. These and other features of this disclosure are discussed in greater detail in the following paragraphs of this detailed description.

Figure 1:
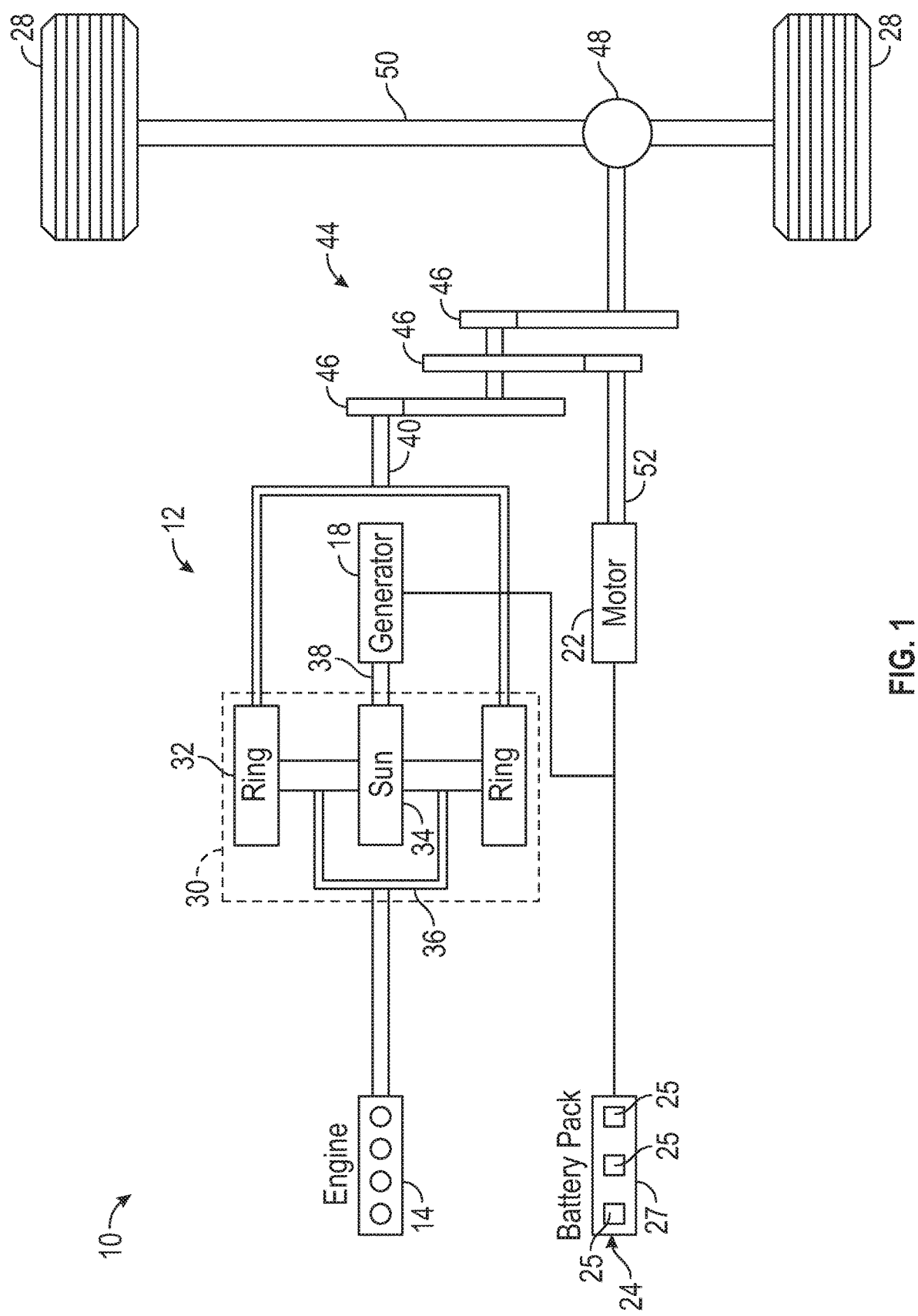
FIG. 1 schematically illustrates a powertrain of an electrified vehicle.

FIG. 1 schematically illustrates a powertrain 10 of an electrified vehicle 12. In an embodiment, the powertrain 10 is a powertrain of a hybrid electric vehicle (HEV). However, although depicted in an embodiment as a HEV, the concepts described herein could extend to other electrified vehicles, including, but not limited to, plug-in hybrid electric vehicles (PHEV's), battery electric vehicles (BEV's), fuel cell vehicles, etc.

In an embodiment, the powertrain 10 is a power-split powertrain system that employs first and second drive systems. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems are each capable of generating torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids, or micro hybrids.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In a non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In a non-limiting embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In a non-limiting embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery pack that includes one or more battery assemblies 25 (i.e., battery arrays or groupings of battery cells) housed inside an enclosure assembly 27. The battery assemblies 25 are capable of outputting electrical power to operate the motor 22, the generator 18, and/or other electrical loads of the electrified vehicle 12. Other types of energy storage devices and/or output devices could also be used to electrically power the electrified vehicle 12.

In a non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2:
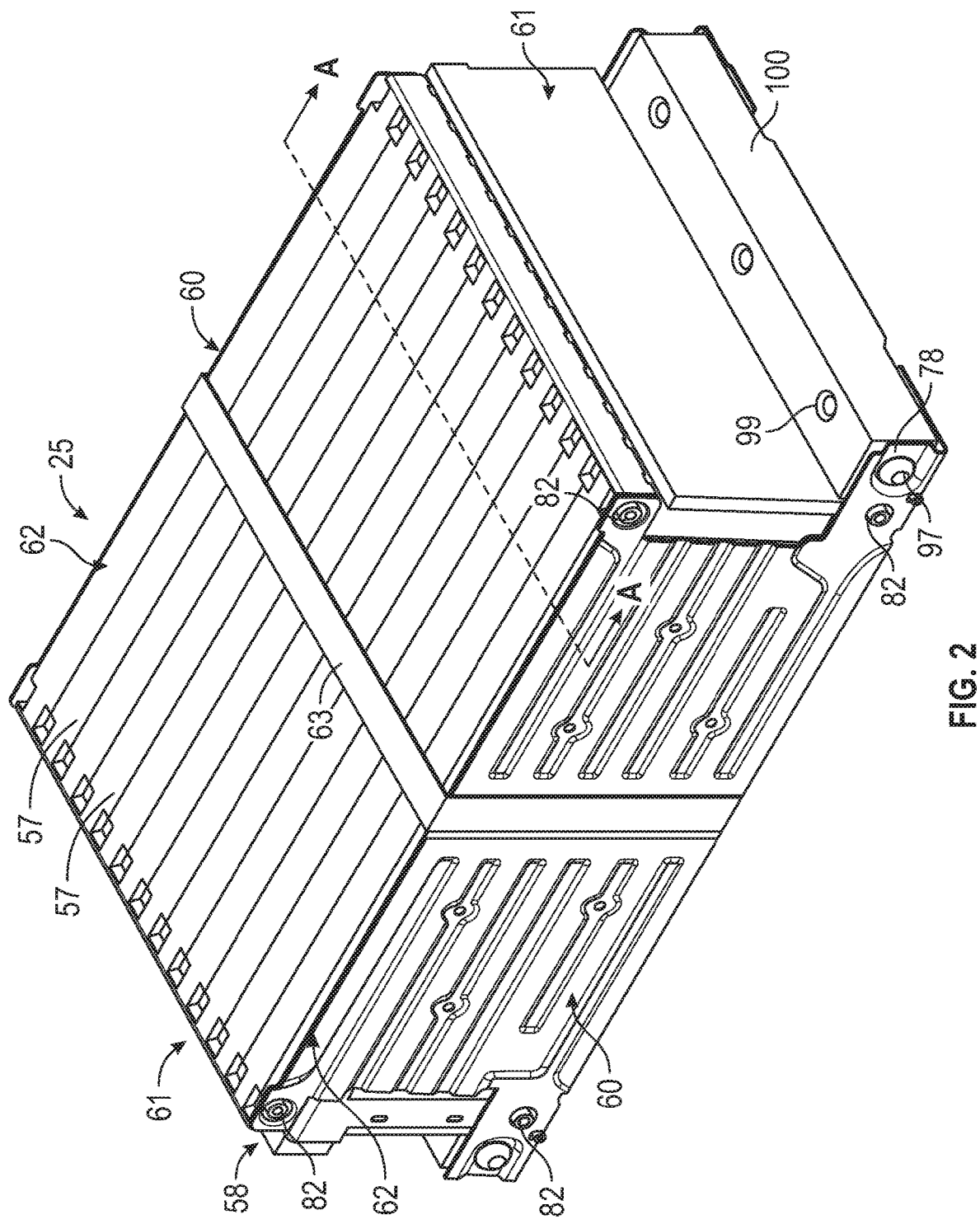
FIG. 2 illustrates a battery assembly of an electrified vehicle.
Figure 3:
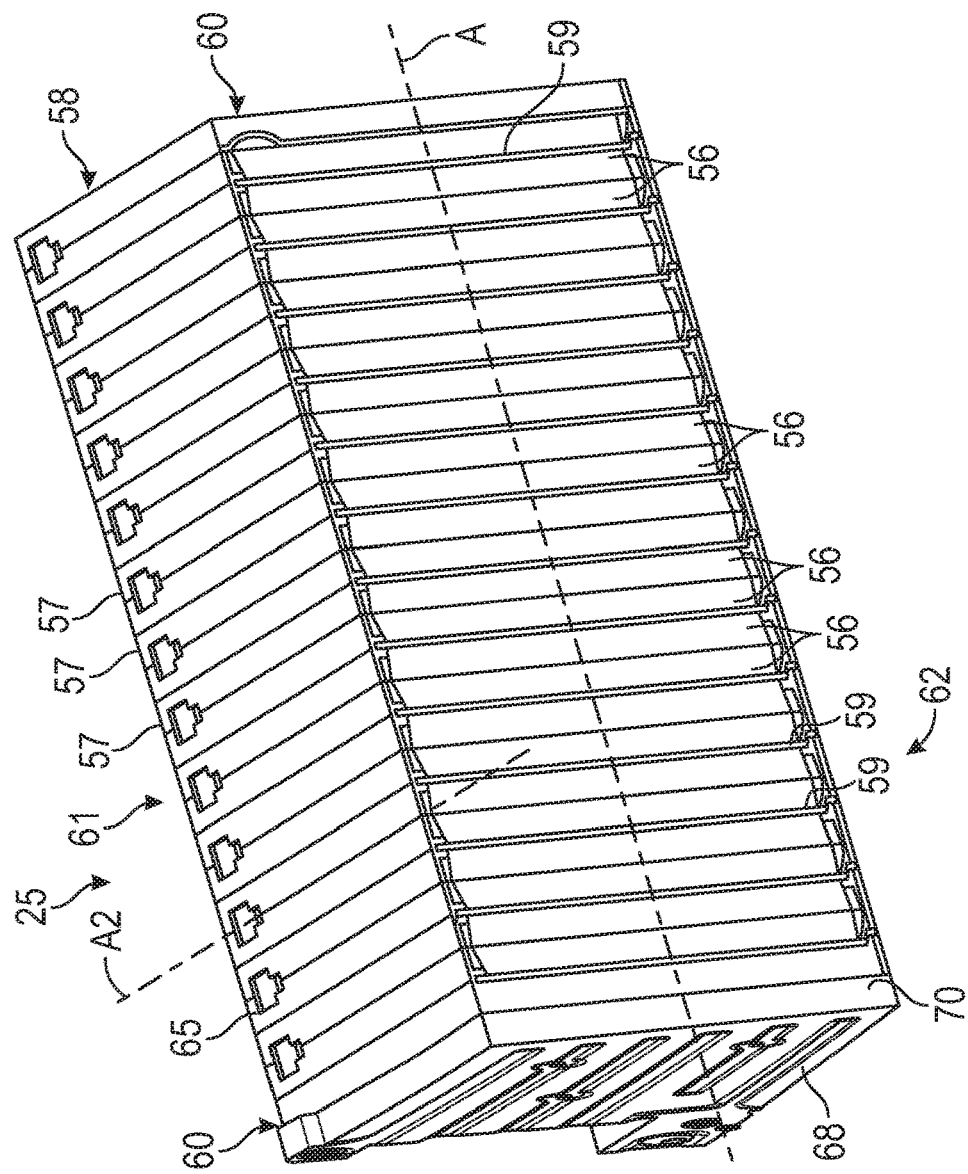
FIG. 3 is a cross-sectional view through section A-A of the battery assembly of FIG. 2.

FIGS. 2 and 3 illustrate a battery assembly 25 that can be employed within an electrified vehicle. For example, the battery assembly 25 could be a component of the battery pack 24 of the electrified vehicle 12 shown in FIG. 1. The battery assembly 25 could be packaged along with one or more additional battery assemblies inside the enclosure assembly 27 of the battery pack 24 of FIG. 1.

The battery assembly 25 includes a plurality of battery cells 56 that store energy for powering various electrical loads of the electrified vehicle 12. Although a specific number of battery cells are depicted in FIGS. 2-3, the battery assembly 25 could employ a greater or fewer number of cells within the scope of this disclosure. In other words, this disclosure is not limited to the specific configuration shown in the exemplary figures.

The battery cells 56 may be stacked side-by-side along a stack axis A to construct a grouping of battery cells 56, sometimes referred to as a "cell stack." In an embodiment, the battery cells 56 are lithium-ion pouch cells. However, battery cells having other geometries (cylindrical, prismatic, etc.), other chemistries (nickel-metal hydride, lead-acid, etc.), or both, could alternatively be utilized within the scope of this disclosure.

The battery cells 56 may be held within array frames 57. Each array frame 57, for example, may hold one or more battery cells 56. In an embodiment, a thermal fin 59 (see FIG. 3) is also held by the array frames 57. The thermal fins 59 can be positioned between adjacent battery cells 56 of the cell stack to thermally manage any heat generated by the battery cells 56.

The battery cells 56 of the battery assembly 25 may be supported by a support structure 58 disposed around an outer perimeter of the cell stack. In an embodiment, the support structure 58 includes one or more array plate assemblies 60 and one or more support plates 61. Together, the array plate assembly 60 and the support plates 61 may be interconnected to axially constrain the battery cells 56 in the stacked configuration.

The support structure 58 may optionally include one or more bindings 63. The bindings 63 may be wrapped around the battery assembly 25 to help axially constrain the battery cells 56.

In an embodiment, the battery assembly 25 includes two array plate assemblies 60 disposed at each longitudinal extent 62 of the battery assembly 25. In this embodiment, the array plate assemblies 60 act as end plates of the support structure 58 that extend in parallel with longitudinal axes A2 of the battery cells 56, and the support plates 61 may act as side plates of the support structure 58 that extend perpendicularly to the longitudinal axes A2.

Figure 5:
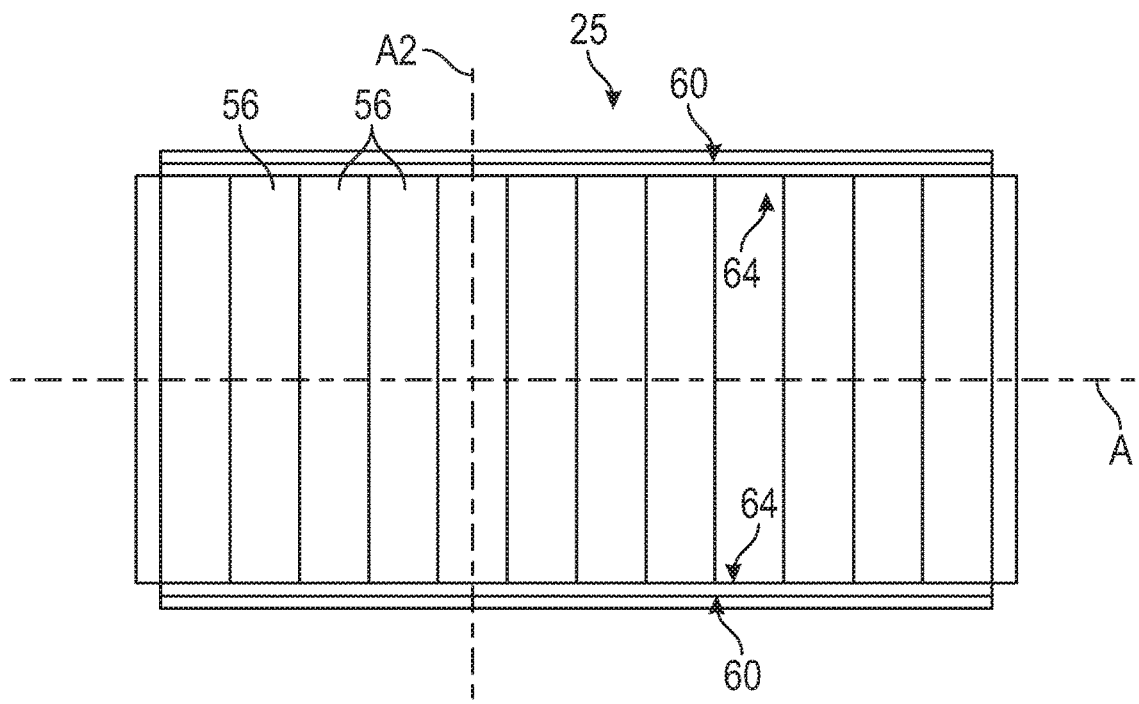
FIG. 5 illustrates another exemplary battery assembly.

In another embodiment, the array plate assemblies 60 are disposed along each side 64 of the battery assembly 25 (see, e.g., FIG. 5). In this embodiment, the array plate assemblies 60 act as side plates of the support structure 58 that extend perpendicularly to the longitudinal axes A2 of the battery cells 56, and the support plates 61 act as end plates of the support structure 58 that extend in parallel with the longitudinal axes A2 of the battery cells 56.

Figure 6:
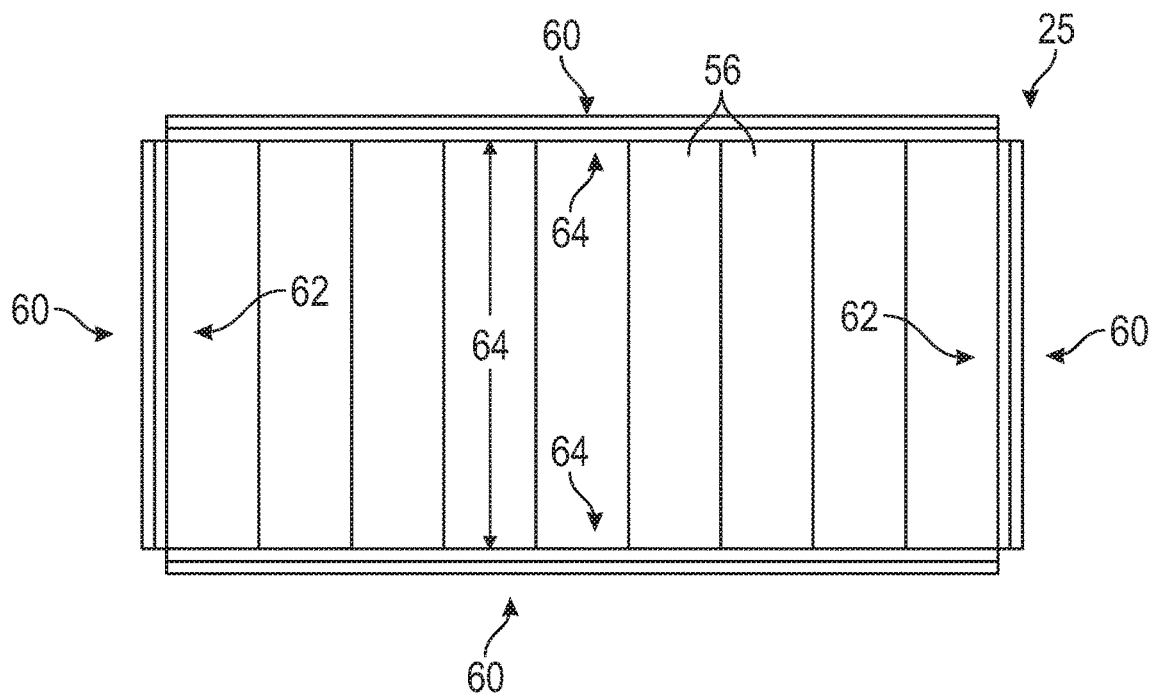
FIG. 6 illustrates yet another exemplary battery assembly.

In yet another embodiment, the support structure 58 includes array plate assemblies 60 disposed along both the longitudinal extents 62 and the sides 64 of the battery assembly 25 (see, e.g., FIG. 6). In this embodiment, the battery assembly 25 includes four total array plate assemblies 60. The total number of array plate assemblies 60 and support plates 61 utilized within the battery assembly 25 is design specific and may depend on the amount of stiffness that is necessary to maintain consistent battery assembly dimensions.

Figure 4:
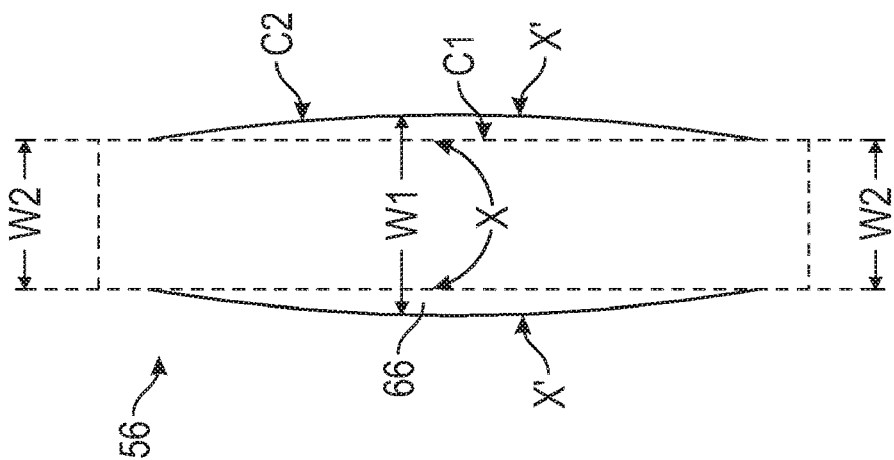
FIG. 4 illustrates a battery cell of the battery assembly of FIG. 2.

Referring now primarily to FIGS. 3-4, one or more of the battery cells 56 of the battery assembly 25 may bulge, swell, or otherwise expand during certain conditions, such as charging and discharging conditions. For example, one or more of the battery cells 56 of the battery assembly 25 may bulge, swell, or expand between a first position X (shown in phantom lines) and a second positon X' (shown in solid lines). The battery cells 56 may bulge to any position between the first position X and the second position X'. The battery cells 56 may bulge in response to heat generation or chemical reactions that occur inside the battery cells 56.

In an embodiment, the first position X of the battery cell 56 generally refers to an uncharged profile of the battery cell 56 and the second position X' generally refers to a charged profile. An exterior casing 66 of the battery cell 56 may include a first contour C1 that is generally planar (or less bulged) in the first position X and a second contour C2 that is generally non-planar (or more bulged) in the second position X'.

The varying profiles of the battery cells 56 of the battery assembly 25 can cause the array plate assemblies 60 to deflect away from the battery cells 56, thereby resulting in inconsistent cell stack dimensions and intrusion into surrounding battery components (e.g., cooling ports, electrical connectors, or other vulnerable battery components). For example, the overall length of the battery assembly 25 may become larger when one or more battery cells 56 bulge toward the second position X'. To address this issue, the array plate assemblies 60 of the support structure 58 may include a split panel design for increasing the stiffness of the construct without significantly increasing the overall package depth of the battery assembly 60. Exemplary array plate assemblies 60 that embody split panel designs are discussed in greater detail below.

Figure 7:
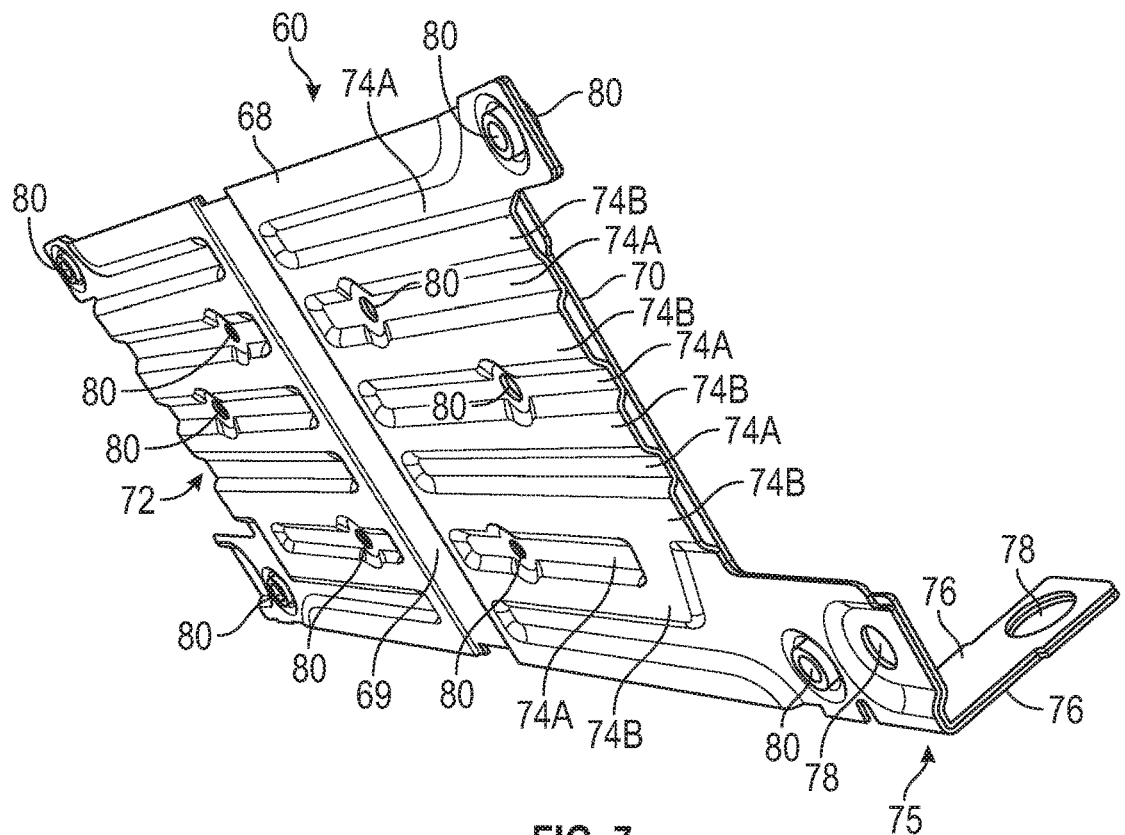
FIG. 7 illustrates an array plate assembly according to an embodiment of this disclosure. The exemplary array plate assembly may include a split panel design.
Figure 8:
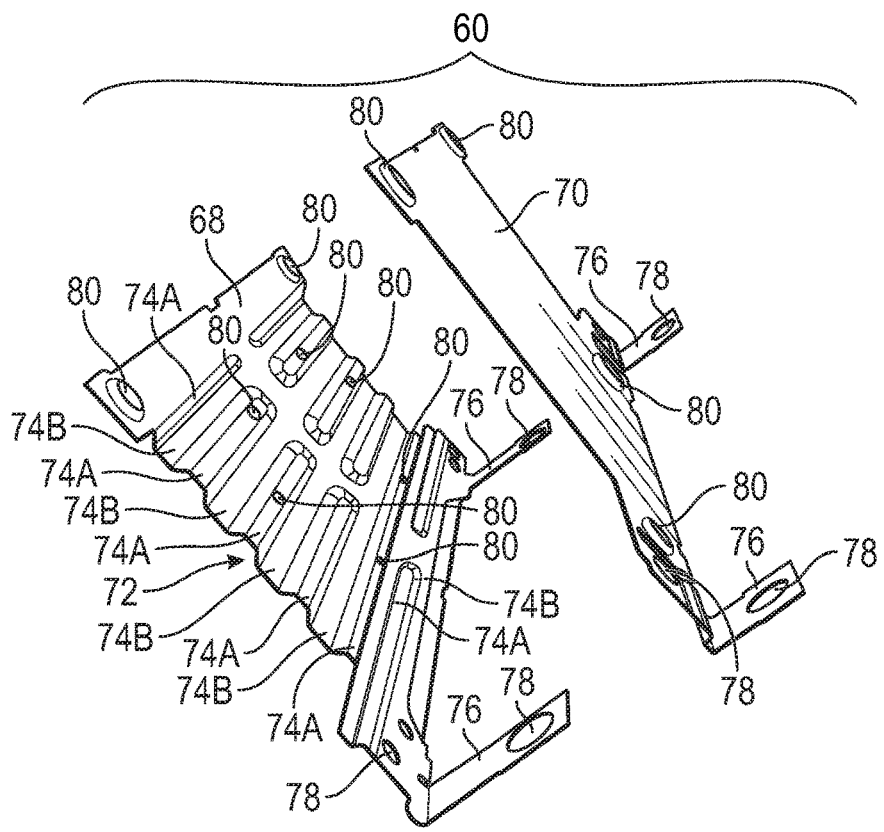
FIG. 8 is an exploded view of the array plate assembly of FIG. 7.

FIGS. 7 and 8, with continued reference to FIGS. 2-4, illustrate an exemplary array plate assembly 60 of the battery assembly 25. The array plate assembly 60 may include an outer panel 68 and an inner panel 70 that nest together (i.e., fit close together or one within another). When the array plate assembly 60 is mounted to the battery assembly 25, the inner panel 70 is received against at least a portion of the cell stack (e.g., against one or more battery cells 56 or one or more array frames 57) and is thus positioned between the cell stack and the outer panel 68 (see, e.g., FIGS. 2-3).

In an embodiment, the outer panel 68 and the inner panel 70 have substantially equivalent thicknesses. In another embodiment, the outer panel 68 and the inner panel 70 include slightly different thicknesses.

The outer panel 68 and the inner panel 70 may be stamped metallic panels having any size or shape. In an embodiment, the material of the outer panel 68 includes a different grade and strength than the material of the inner panel 70. However, the size, shape, and material make-up of the outer panel 68 and the inner panel 70 are not intended to limit this disclosure. In addition, the outer and inner panels 68, 70 could be manufactured using other manufacturing techniques.

Figure 9:
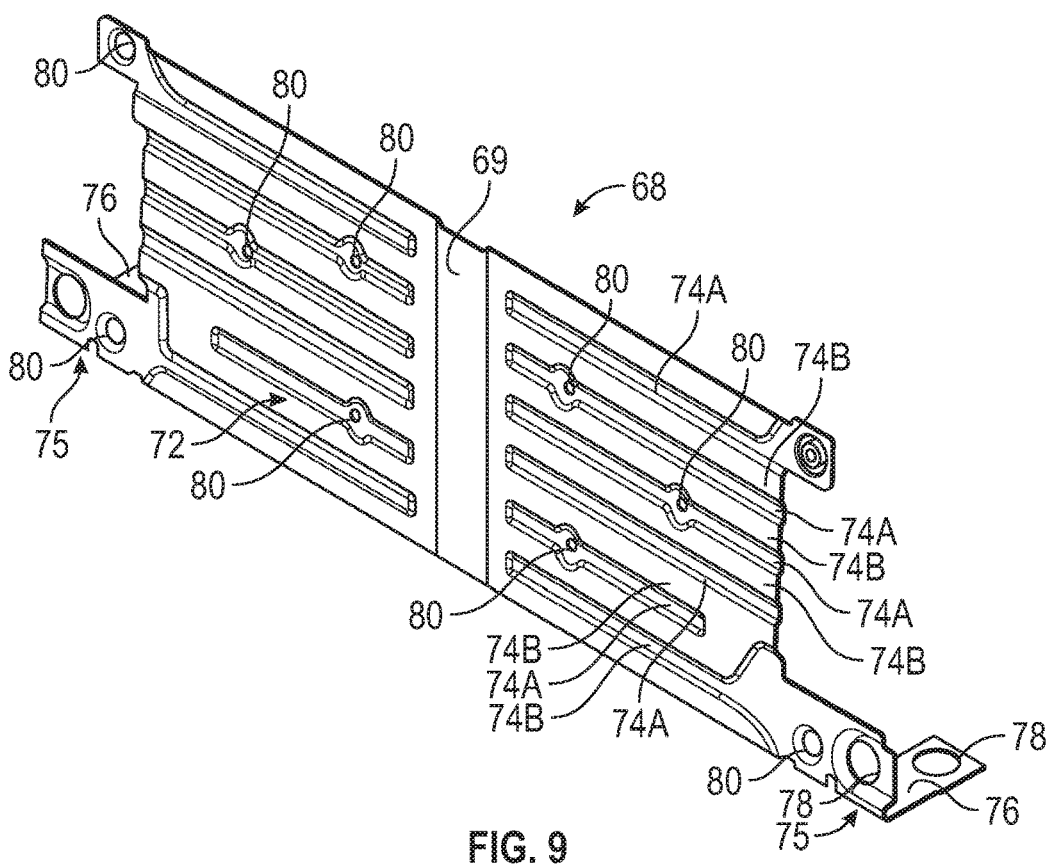
FIG. 9 illustrates an outer panel of the array plate assembly of FIG. 7.
Figure 10:
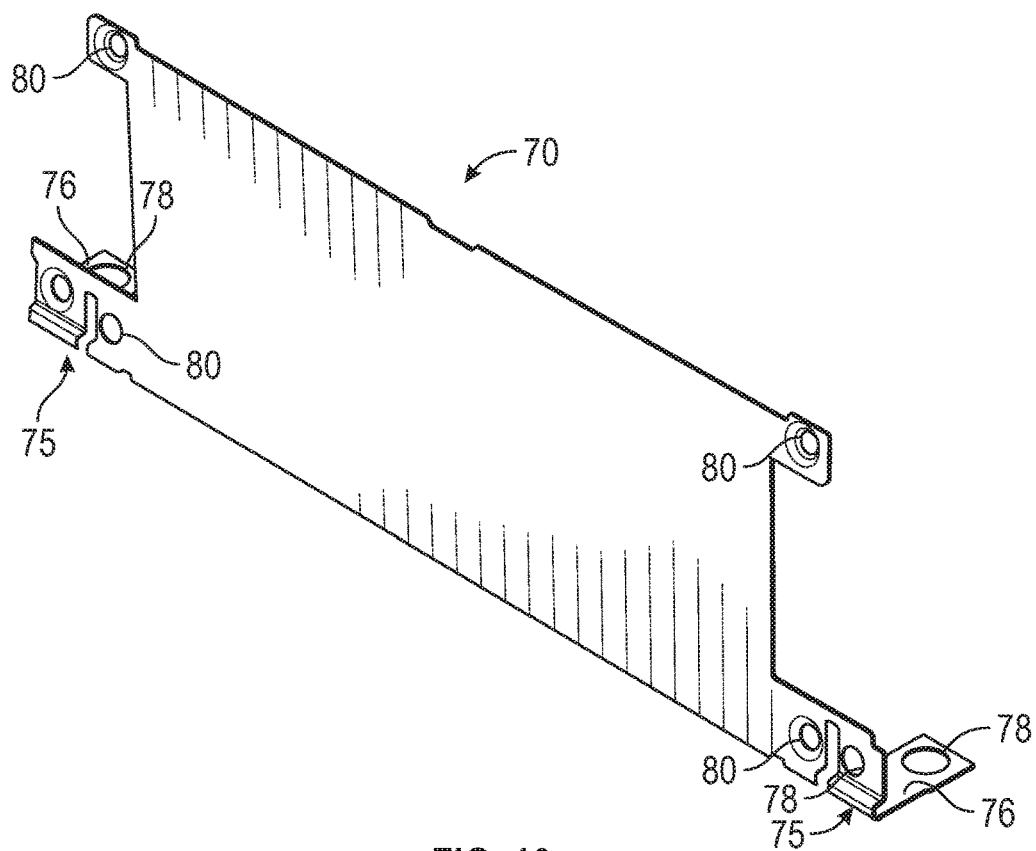
FIG. 10 illustrates an inner panel of the array plate assembly of FIG. 7.
Figure 11:
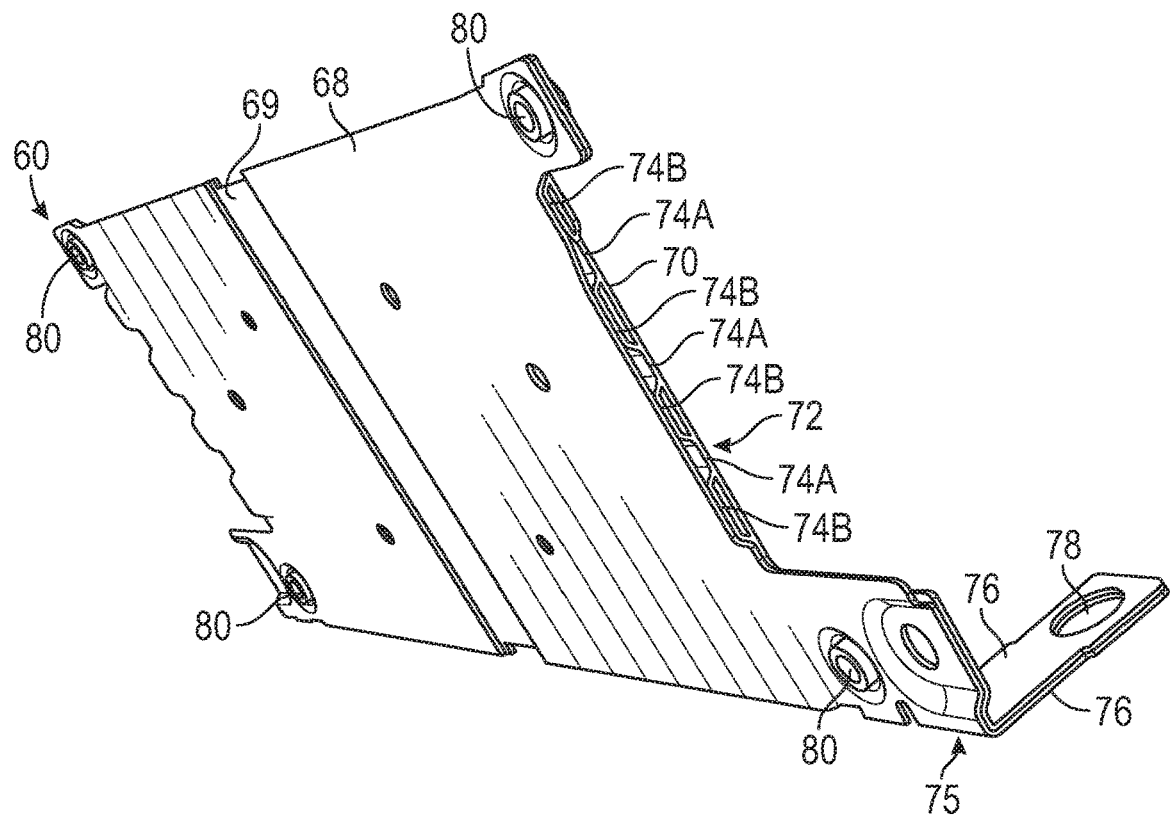
FIG. 11 illustrates an array plate assembly according to another embodiment of this disclosure.

The outer panel 68, the inner panel 70, or both, may include an embossing pattern 72. The embossing pattern 72 is configured to improve the stiffness of the array plate assembly 60. In an embodiment, the outer panel 68 includes the embossing pattern 72 (see FIGS. 7-9). In another embodiment, the inner panel 70 includes the embossing pattern 72 (see FIG. 11). In yet another embodiment, both the outer panel 68 and the inner panel 70 include embossing patterns 72 (see FIG. 12).

The embossing pattern 72 may include a plurality of ribbed sections. In an embodiment, a first plurality of ribbed sections 74A protrude in a first direction from the outer panel 68/inner panel 70 and a second plurality of ribbed sections 74B protrude in a second, opposite direction from the first direction.

In the illustrated embodiments, the ribbed sections 74A, 74B of the embossing patterns 72 extend horizontally across the outer panel 68/inner panel 70. However, the ribbed sections 74A, 74B could alternatively extend vertically, or both horizontally and vertically, relative to the outer panel 68/inner panel 70. In another embodiment, the outer panel 68 may include a central ribbed section 69 (extending vertically in the illustrated embodiment) that is configured to accommodate the binding 63.

Each of the outer panel 68 and the inner panel 70 may include a pair of mounting legs 76 that protrude outwardly from bottom corner sections 75 of the outer panel 68/inner panel 70. The mounting legs 76 of the inner panel 70 may nest with the mounting legs 76 of the outer panel 68 when the inner panel 70 is received against the outer panel 68. Each mounting leg 76 may include one or more openings 78 that are configured to receive a fastener 99 for mounting the array plate assembly 60 to a portion of the battery pack 24, such as a structure 100 of the enclosure assembly 27 (see FIG. 2), for example.

Each of the outer panel 68 and the inner panel 70 may additionally include a plurality of mounting openings 80 that are formed through the outer panel 68/inner panel 70. The mounting openings 80 of the outer panel 68 align with the mounting openings 80 of the inner panel 70 when the inner panel 70 is received against the outer panel 68. A fastener 82 (see FIG. 2) may be inserted through the aligned mounting openings 80 to mount the array plate assembly 60 to the cell stack. In an embodiment, the fasteners 82 are inserted through the aligned mounting openings 80 and into one or more of the array frames 57 to mount the array plate assembly 60 to the cell stack (see, e.g., FIG. 2).

In the exemplary embodiment of FIGS. 7-10, in which only the outer panel 68 includes the embossing pattern 72, the main body of the inner panel 70 may be substantially flat (i.e., without any creases or undulations). In an alternative embodiment shown in FIG. 11, in which only the inner panel 70 includes the embossing pattern 72, the main body of the outer panel 68 may be substantially flat.

Figure 12:
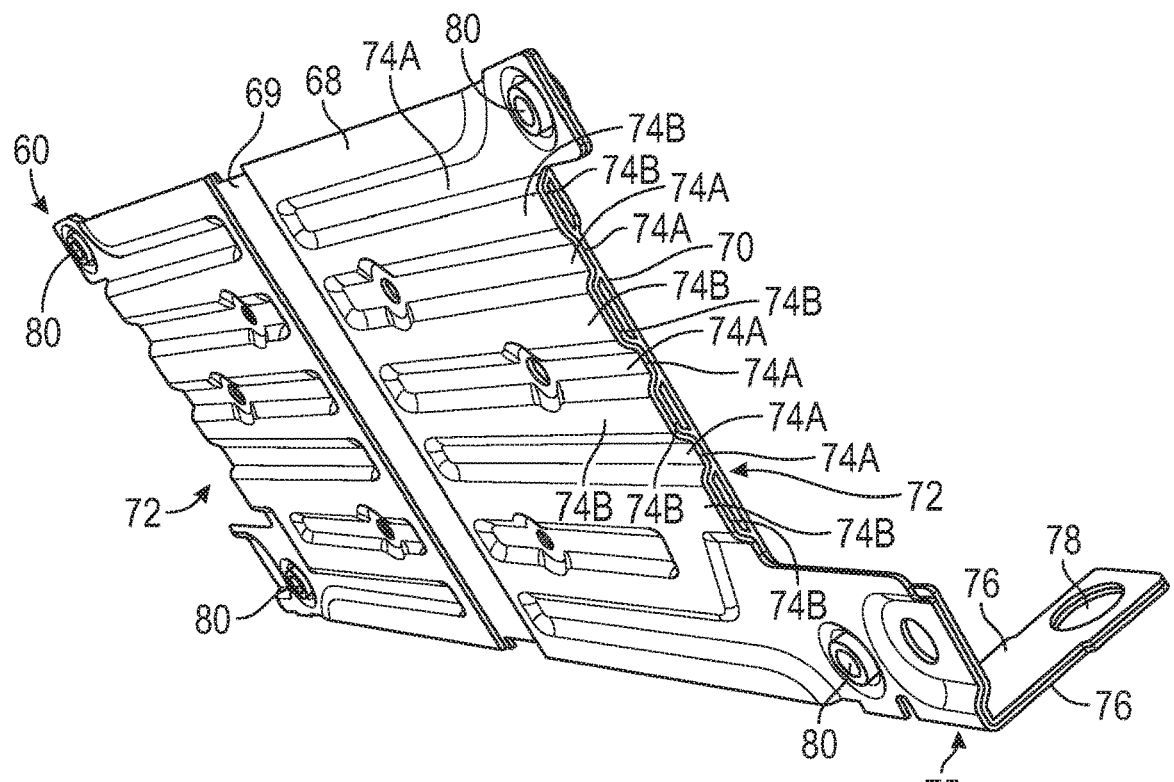
FIG. 12 illustrates an array plate assembly according to yet another embodiment of this disclosure.

Referring now to FIG. 12, in which both the outer plate 68 and the inner plate 70 include embossing patterns 72, the embossing pattern 72 of the inner plate 70 may be reversed as compared to the embossing pattern 72 of the outer plate 68. Therefore, the first plurality of ribbed sections 74A of outer plate 68 may nest within the first plurality of ribbed sections 74A of the inner plate 70, and the second plurality of ribbed sections 74B of the inner plate 70 may nest within the second plurality of ribbed sections 74B of the outer plate 68.

The exemplary battery assemblies of this disclosure include array plate assemblies that exhibit split panel designs for increasing the stiffness and section modulus of the end plate assemblies without increasing the overall package depth of the battery assembly. The proposed designs may additionally reduce array plate deflections, thereby reducing intrusion into nearby battery components.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery assembly, comprising:
a grouping of battery cells; and
an array plate assembly in contact with a portion of the grouping of battery cells,
wherein the array plate assembly includes an outer panel and an inner panel that nest together,
wherein the outer panel includes a first mounting leg and the inner panel includes a second mounting leg that nests with the first mounting leg.

2. The battery assembly as recited in claim 1, wherein the grouping of battery cells includes a plurality of battery cells held within a plurality of array frames, and further wherein the array plate assembly is received against at least one of the plurality of battery cells or at least one of the plurality of array frames.

3. The battery assembly as recited in claim 1, wherein the array plate assembly is positioned at a longitudinal extent of the grouping of battery cells.

4. The battery assembly as recited in claim 1, wherein the array plate assembly is positioned along a side of the grouping of battery cells.

5. The battery assembly as recited in claim 1, wherein the inner panel is positioned between the grouping of battery cells and the outer panel.

6. The battery assembly as recited in claim 1, wherein the outer panel or the inner panel includes an embossing pattern.

7. The battery assembly as recited in claim 1, wherein each of the outer panel and the inner panel includes an embossing pattern, and a first plurality of ribbed sections of the embossing pattern of the inner panel nest within a first plurality of ribbed sections of the embossing pattern of the outer panel, and further wherein a second plurality of ribbed sections of the embossing pattern of the outer panel nest within a second plurality of ribbed sections of the embossing pattern of the inner panel.

8. The battery assembly as recited in claim 1, wherein the first mounting leg includes a first opening and the second mounting leg includes a second opening that aligns with the first opening.

9. The battery assembly as recited in claim 8, comprising a fastener that extends through the first opening and the second opening.

10. The battery assembly as recited in claim 8, wherein each of the outer panel and the inner panel includes a plurality of aligned mounting openings.

11. A battery pack comprising the battery assembly of claim 1.

12. An electrified vehicle comprising the battery pack of claim 11.

13. A battery assembly, comprising:
a grouping of battery cells;
an array plate assembly in contact with a portion of the grouping of battery cells,
wherein the array plate assembly includes an outer panel and an inner panel that nest together;
a first fastener received through the outer panel and the inner panel and extending into a base structure of a battery enclosure assembly; and
a second fastener received through the outer panel and the inner panel and extending into an array frame of the grouping of battery cells.

14. The battery assembly as recited in claim 13, wherein the first fastener is received through a pair of aligned openings formed through mounting legs of the outer panel and the inner panel, and the second fastener is received through a pair of aligned mounting openings of the outer panel and the inner panel.

15. The battery assembly as recited in claim 1, wherein one of the outer panel or the inner panel includes an embossing pattern and the other of the outer panel or the inner panel excludes any embossing pattern.

16. The battery assembly as recited in claim 1, wherein the outer panel includes a ribbed section, and comprising a binding that is accommodated within the ribbed section and is wrapped around the grouping of battery cells.

17. The battery assembly as recited in claim 1, wherein the outer panel and the inner panel are both metallic panels, and further wherein a first grade and strength of a first material of the outer panel is different from a second grade and strength of a second material of the inner panel.

18. A battery pack, comprising:
an enclosure assembly including a base structure;
a grouping of battery cells received against the base structure;
an array plate assembly received against a portion of the grouping of battery cells,
wherein the array plate assembly includes an outer panel and an inner panel that nest together; and
a first fastener received through the outer panel and the inner panel and extending into the base structure to mount the array plate assembly to the base structure.

19. The battery pack as recited in claim 18, comprising a second fastener received through the outer panel and the inner panel and extending into an array frame of the grouping of battery cells to mount the array plate assembly to the grouping of battery cells.

* * * * *